United States Patent Office 3,468,855
Patented Sept. 23, 1969

3,468,855
VULCANIZATION WITH p,p'-OXYBIS(THIO-PHENOL) AND AT LEAST ONE ACTIVATOR SELECTED FROM SULFUR AND AN ORGANIC PEROXIDE CURATIVE
Byron A. Hunter, Woodbridge, Conn., assignor to Uniroyal, Inc., a corporation of New Jersey
No Drawing. Filed Oct. 13, 1966, Ser. No. 586,365
Int. Cl. C08c 11/54; C08d 13/28; C08f 45/72
U.S. Cl. 260—79.3        8 Claims

ABSTRACT OF THE DISCLOSURE

Vulcanizable elastomers can be vulcanized with p,p'-oxybis(thiophenol) and at least one activator selected from (i) sulfur and (ii) organic peroxide curatives.

---

This invention relates to the vulcanization of rubber with p,p'-oxybis(thiophenol):

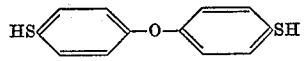

More particularly the invention relates to the vulcanization of unsaturated or saturated rubbers with p,p'-oxybis(thiophenol) and, as an activator therefor, at least one substance selected from (i) sulfur, or (ii) organic peroxide curatives.

Reaction of dithiols (ethane dithiol, benzene dithiol, and the like) with ethylenically unsaturated compounds, under the influence of ultra-violet rays, to yield polysulfides, is disclosed in U.S. Patent 2,347,182, Apr. 25, 1944, Coffman, but this process does not suggest a useful method of vulcanizing rubber.

Hull et al., Industrial & Engineering Chemistry, vol. 40, pp. 513–517 (March 1948) describe vulcanization with dithiols such as trimethylene dithiol, bis(2-mercapto ethyl) ether, and benzene 1,3-dithiol, but unfortunately with accompanying severe scorching or precure, i.e., disintegration and crumbling of the rubber during or very soon after compounding.

The present invention is based on the discovery that rubber can be vulcanized with p,p'-oxybis(thiophenol). This new method of vulcanizing rubber does not suffer from the disadvantages of certain prior art vulcanizations and affords important practical advantages. Scorching or premature vulcanization, associated with many previously suggested mercapto containing compounds, is avoided by using the vulcanizing agent of the invention.

The vulcanization of rubber with p,p'-oxybis(thiophenol) in accordance with the invention proceeds in the presence of small, catalytic amounts of sulfur, as distinguished from the relatively larger quantities of sulfur employed in conventional vulcanizations. Such conventional high sulfur levels lead in turn to vulcanizates more susceptible to oxygen and hot air aging, whereas the vulcanizates of the invention have excellent aging characteristics because the sulfur level used is only that required for catalysis and it is believed that sulfur cross-links, if they occur at all, are extremely limited.

An important advantage of vulcanizing with p,p'-oxybis(thiophenol) in accordance with the invention is that the vulcanizates do not show the peaking of properties (i.e., rapid decrease in physical properties after once reaching a maximum) associated with conventional dimercaptan cures.

The present curing agent is unique in that although it contains two SH groups, only one such thio group exists on each aromatic ring. Thus the present agent is a true bis thiophenol as opposed to a dimercaptan. The relatively high molecular weight of the present curing agent provides reduced volatility. Since p,p'-oxybis(thiophenol) is a solid even at moderate mill temperatures, it is highly convenient and practical to work with.

The present curative permits the manufacturer a wide latitude in selection of curing temperature without fear of adversely affecting the vulcanizate properties, even by fast, high temperature curing. This is an important feature in practice, for it is well known in the art that where sulfur accelerated curing systems are used, increasing the curing temperature to achieve higher rates generally leads to inferior physical properties.

The invention may be practiced by mixing the p,p'-oxybis(thiophenol) with the rubber to be vulcanized in any suitable conventional manner, such as on a roll mill or in an internal mixer. The quantity of the vulcanizing agent employed is not critical and may vary from, for example, 1 part (by weight, per 100 parts of rubber) or less to 5 parts or more, preferably 1.5 to 4 parts, the optimum in many cases being about 2.5 parts, although the amount used will vary with the particular rubber involved, the other ingredients in the formulation, the curing conditions employed, and the particular properties desired in the final vulcanizate.

Only a small, catalytic amount of sulfur is required, as previously indicated, less than about one-half part, usually not more than about 0.3 or 0.2 part, down to for example as little as 0.05 part or less.

In another form of the invention, the p,p'-oxybis(thiophenol) is used as a vulcanizing agent along with an organic peroxide curative (as disclosed, for example in U.S. Patent 3,179,554, Gladding et al., Apr. 20, 1965, col. 3, lines 11–31), frequently in amount ranging from about 1 to about 5 parts. An important advantage of the p,p'-oxybis(thiophenol) in this form of the invention is that it results not only in improved properties but it reduces the odor of the vulcanizate and changes the odor to a less offensive type, as compared with the malodorous conventional peroxide vulcanizates. This reduction and actual change in odor is brought about by the use of the present p,p'-oxybis(thiophenol) not only because such use allows reduction in the peroxide required for a given degree of cure, but it is also believed to be possible that a reaction may occur with the by-products of the peroxide decomposition to form less volatile and less odorous substances.

The vulcanizable composition of the invention in addition to the rubber, the sulfur and/or the organic peroxide curative, may further contain various other suitable compounding ingredients, including fillers or pigments such as carbon black, silica etc., conventional inorganic or organic activators or accelerators, extenders, plasticizers, softeners or processing aids, antioxidants or antiozonants, etc. The time and temperature conditions of vulcanization may be in accordance with conventional practice, the optimum in any given case depending upon such variables as the particular formulation, the size of the article being vulcanized, the character of the heating device, etc.

The rubbers to which the invention applies include the usual conventional vulcanizable rubbers, including such unsaturated rubbers as the rubbery diene polymers, especially the diolefin homopolymers (e.g. polyisoprene [whether natural or synthetic], polybutadiene [emulsion-prepared or solution-prepared]), and copolymers of such dienes with one or more ethylenically unsaturated copolymerizable monomers such as styrene (e.g., SBR, solution—or emulsion—prepared), acrylonitrile (e.g., NBR), isobutylene (e.g., butyl rubber, chlorobutyl rubber), ethylene and alpha-olefins (e.g., EPDM, that is, rubbery terpolymers of ethylene and propylene with such copolymerizable non-conjugated dienes as dicyclopentadiene, 1,4-hexadiene, methylene norbornene, etc.) and such saturated vulcanizable rubbers as the chlorosulfonated polyolefins (e.g., chlorosulfonated polyethylene, chlorosulfonated polypropylene, chlorosulfonated ethylene-propylene copolymer), EPR, and the like. Polychloroprene and silicone rubbers may also be mentioned.

The p,p'-oxybis(thiophenol) employed as a curing agent or vulcanizing aid in accordance with the invention may be prepared as follows:

A mixture of 367 grams (1 mole) of p,p'-oxybis(benzene sulfonyl chloride) and 600 grams of granular tin (20 mesh) is added gradually to a hot (105–110° C.) solution of 2 liters of concentrated hydrochloric acid in 1 liter of water. The reaction is permitted to subside between additions. After all of the solid mixture has been added, the reactants are kept at 110° C. for one hour. The hot mixture is decanted from some undissolved tin and allowed to cool, whereupon p,p'-oxybis(thiophenol) crystallizes as a light yellow solid. It is filtered off, washed with dilute hydrochloric acid and then with water. The dried product weighs 193 g. and melts at 100–103° C.

The following examples, in which all quantities are expressed by weight, will serve to illustrate the invention in more detail.

Example I

In this example the use of p,p'-oxybis(thiophenol) as a vulcanizing agent is contrasted with the unsatisfactory results obtained with a typical dimercaptan, alpha,alpha'-dimercapto-p-xylene. Three different stocks are prepared, having the formulations shown in Table I, and subjected to the Mooney scorch test (ASTM D1646–61). The physical properties are determined after curing for 30 minutes at 320° F., with the results shown in Table I.

TABLE I.—FORMULATIONS

| Ingredients | Stock, Parts by Weight | | |
|---|---|---|---|
|  | A | B | B |
| SBR (23% styrene) | 100 | 100 | 100 |
| Carbon black | 50 | 50 | 50 |
| p,p'-Oxybis(thiophenol) | 2.5 |  |  |
| Alpha-alpha'-dimercapto-p-xylene |  | 2.5 | 1.8 |
| Zinc oxide | 3.0 | 3.0 | 3.0 |
| Sulfur | 0.2 | 0.2 | 0.2 |
| Tests: |  |  |  |
| Mooney scorch time, minutes (250° F.) | 5.83 | (¹) | (¹) |
| Mooney cure time, minutes (250° F.) | 5.75 | (¹) | (¹) |
| Mooney scorch time, minutes (270° F.) | 4 | (¹) | (¹) |
| Mooney cure time, minutes (270° F.) | 3 | (¹) | (¹) |
| Tensile strength (p.s.i.) | 3,130 | 2,330 | 2,202 |
| Elongation at break (percent) | 460 | 420 | 550 |
| Modulus at 300% elongation (p.s.i.) | 1,820 | 1,370 | 1,070 |
| ASTM hardness number | 66 | 58 | 57 |

¹ These stocks scorched spontaneously before the scorch test could be run.

In Table I stock A represents the invention; stocks B and C are outside the invention and are included for purposes of comparison only. The use of dimercaptans as in stocks B and C produces stocks which scorch, i.e., are no longer processible after incorporation of the curing system, while stock A of the invention containing p,p'-oxybis(thiophenol) has greatly increased processing safety, well into a range which allows practical commercial use. In addition it should be pointed out that the activity (either on an equal SH group or equal weight basis) of the p,p'-oxybis(thiophenol) in stock A is superior to that of the dimercaptan of stocks B and C. Thus the invention achieves both increased safety and increased activity in the same substance.

Example II

This example demonstrates the absence of "peaking" in the p,p'-oxybis(thiophenol) cures of the invention. The following formulation is prepared:

| | |
|---|---|
| SBR (23% styrene) | 100 |
| Carbon black (HAF) | 50 |
| p,p'-Oxybis(thiophenol) | 0.2 |
| Sulfur | 0.2 |
| Zinc oxide | 0.3 |
| | 155.7 |

Samples of the compound are cured for the times and temperatures indicated in Table II, with the results shown.

TABLE II

| 350° F. Cure Time | 15 min. | 30 min. | 60 min. |
|---|---|---|---|
| Tensile | 3,380 | 3,390 | 3,390 |
| Elongation | 450 | 440 | 350 |
| 300% Modulus | 1,950 | 2,120 | 2,420 |
| Hardness | 70 | 72 | 72 |

| 450° F. Cure Time | 30 sec. | 1 min. | 3 min. |
|---|---|---|---|
| Tensile | 3,170 | 3,260 | 3,020 |
| Elongation | 500 | 440 | 310 |
| 300% Modulus | 1,630 | 2,050 | 2,860 |
| Hardness |  |  | 68 |
| Tear strength, p.s.i. | 400 | 460 | 410 |

As can easily be seen from Table II, there is little or no tendency for the properties to be "peaky," i.e., to reach a maximum and then tend to decline. Furthermore, the state of cure and *quality* of the vulcanizate are not adversely affected by raising the temperature to achieve rapid cure as is known to be the case where sulfur crosslinks predominate. Considering the rate of vulcanization to double with every 18° F. increase, as is the case, roughly, for sulfur vulcanization, the satisfactory cure of 15' (900 seconds) at 320° F. would require only 6 seconds at 450° F. [900 times (.5) to the (450–320)/18 power equals 6]. Thus, 3 minutes (180 seconds) at 450° F. is equivalent to some 30 time intervals of over-cure. In spite of this, no substantial reversion in tensile properties has occurred.

Example III

The tendency to produce a non-reverting (non-peaking) cure usually correlates well with excellent aging characteristics. To show the advantage of p,p'-oxybis(thiophenol) over conventional sulfur cure in this respect the following formulations are prepared:

| Stock | D | E |
|---|---|---|
| SBR | 100 | 100 |
| Carbon black | 50 | 50 |
| Zinc oxide | 5 | 5 |
| Stearic acid | 2 | 2 |
| p,p'-Oxybis(thiophenol) | 2.5 |  |
| N-Cyclohexyl benzothiazole sulfenamide |  | 1.25 |
| Sulfur | 0.2 | 1.75 |
|  | 159.7 | 160.0 |

After curing for 30 minutes at 340° F., the aging properties were evaluated with the results shown in Table III.

TABLE III.—AGING TESTS

| | Unaged | | Aged 72 Hours, Air 212° F. | | Aged 96 Hours, O₂, 70° C. | |
|---|---|---|---|---|---|---|
| | D | E | D | E | D | E |
| Tensile | 3,120 | 3,330 | 3,040 | 3,250 | 3,050 | 3,460 |
| Elongation | 510 | 490 | 460 | 340 | 520 | 450 |
| Percent change in elongation |  |  | −9.8 | −30.6 | +2.0 | 8.9 |
| M-300 | 1,440 | 1,800 | 1,770 | 2,640 | 1,480 | 2,330 |
| Percent change in M-300 |  |  | +23.0 | +46.5 | +2.8 | +29.4 |
| Hardness | 67 | 67 | 66 | 70 | 68 | 70 |

In the present system, it is believed that predominately the bis thiophenol acts as the crosslink, thus largely eliminating any S—S bonds and creating in their place C—S—R—S—C bonds. These heterogeneous bonds require higher energies for scission than the S—S bonds and hence yield a more stable vulcanizate. This is not the case where sulfur is *merely* accelerated by a mono or dimercaptan derivative, i.e., N-cyclohexyl benzothiazole sulfenamide, mercaptobenzothiazole, 1,3-butanedithiol.

Example IV

Table IV illustrates the use of p,p'-oxybis(thiophenol) as a curing agent for chlorosulfonated polyethylene elastomer.

TABLE IV.—FORMULATIONS

|  | F | G | H |
|---|---|---|---|
| Chlorosulfonated polyethylene (Hypalon 40) | 100 | 100 | 100 |
| Magnesium oxide | 10 | 10 | 10 |
| Carbon black | 40 | 40 | 40 |
| Polyethylene | 4 | 4 | 4 |
| Petrolatum | 2 | 2 | 2 |
| p,p'-Oxybis (thiophenol) | 3 | 5 |  |
| Sulfur | 0.3 | 0.3 |  |
| Diphenylguanidine |  | 0.5 |  |
| Tests (Cure 30 min. at 320° F.): |  |  |  |
| Tensile | 2,630 | 4,060 | 1,000 |
| Elongation | 300 | 250 | 360 |
| M-200 | 1,960 | 3,530 | 860 |
| Hardness | 85 | 90 | 80 |

It can be seen from Table IV that an excellent cure can be imparted to chlorosulfonated polyethylene in spite of the fact that the polymer contains no unsaturation. The extremely tight cure obtained in stock G increases the usefulness of the polymer in places where resistance to compression is an important factor.

Example V

This example illustrates the practice of the invention with another saturated rubber, ethylene-propylene rubber, by means of p,p'-oxybis(thiophenol) in conjunction with organic peroxide. Formulations and data are shown in Table V.

TABLE V.—FORMULATIONS

|  | I | J |
|---|---|---|
| EPR | 100 | 100 |
| Dicumyl peroxide | 3.2 | 3.2 |
| p,p'-Oxybis(thiophenol) | 0.68 |  |
| Carbon black | 50 | 50 |

| | Cure Time (min.) | | | |
|---|---|---|---|---|
| | 15 | 60 | 15 | 60 |
| Tests (Cure temp. 340° F.): | | | | |
| Tensile | 1,460 | 1,550 | 520 | 840 |
| Elongation | 360 | 400 | 620 | 360 |
| M-300 | 1,160 | 1,130 | 410 | 670 |
| Hardness | 75 | 75 | 70 | 74 |

It is believed that the increased strength shown in Table V is produced when the bis(thiophenol) provides additional linkages within the polymer which would not have occurred by carbon to carbon crosslinking. To evaluate the odor of the vulcanizates, 4" x 1" specimens were placed in small sealed jars immediately after curing and the entrapped odor was evaluated after cooling and storage. The vulcanizates from stock I of the invention had an odor that was of a less objectionable kind, and there was actually less odor, as compared to the odor of vulcanizates from stock J. The presence of the p,p'-oxybis-(thiophenol) enables the amount of peroxide to be reduced below what would be required in conventional peroxide cures.

Having thus described my invention, what I claim and desire to protect by Letters Patent is:

1. A vulcanizable composition comprising a mixture of:
   (a) a vulcanizable rubber selected from the group consisting of natural rubber, polyisoprene, polybutadiene-styrene copolymer, butadiene-acrylonitrile copolymer, isoprene-isobutylene copolymer, chlorobutyl rubber, rubbery terpolymers of ethylene and and propylene with dicyclo pentadiene, rubbery terpolymers of ethylene with propylene with 1,4-hexadiene, rubber terpolymers of ethylene and propylene with methylene norbornene, chlorosulfonated polyethylene, chlorosulfonated polypropylene, chlorosulfonated ethylene-propylene copolymer and ethylene propylene copolymer.
   (b) p,p'-oxybis (thiophenol) as an vulcanizing agent for said rubber, and
   (c) at least one activator for said vulcanizing agent selected from the group:
      (i) sulfur, and
      (ii) organic peroxide curative.

2. A method of vulcanizing a vulcanizable rubber comprising subjecting to vulcanizing conditions the vulcanizable composition of claim 1.

3. The vulcanizate resulting from the method of claim 2.

4. A vulcanizate as in claim 3 in which the vulcanizable rubber is selected from the group consisting of natural rubber, polyisoprene, polybutadiene, butadiene-styrene copolymer, butadiene-acrylonitrile copolymer, isoprene-isobutylene copolymer, chlorobutyl rubber, rubbery terpolymers of ethylene and propylene with dicyclo pentadiene, rubbery terpolymers of ethylene and propylene with 1,4-hexadiene, rubbery terpolymers of ethylene and propylene with methylene norbornene; and the said activator is sulfur.

5. A vulcanizate as in claim 4 in which the rubber is styrene-butadiene copolymer.

6. A vulcanizate as in claim 3 in which the vulcanizable rubber is selected from the group consisting of chlorosulfonated polyethylene, chlorosulfonated polypropylene, chlorosulfonated ethylene-propylene copolymer and ethylene propylene rubber; and the said activator is an organic peroxide curative.

7. A vulcanizate as in claim 6 in which the vulcanizable rubber is chlorosulfonated polyethylene and the organic peroxide is dicumyl peroxide.

8. A vulcanizate as in claim 6 in which the vulcanizable rubber is ethylene-propylene copolymer and the organic peroxide is dicumyl peroxide.

References Cited

UNITED STATES PATENTS

| 3,179,554 | 4/1965 | Gladding et al. | 161—216 |
| 3,236,822 | 2/1966 | Sonnabend et al. | 260—79.5 |
| 3,243,411 | 3/1966 | Tawney et al. | 260—61 |

JOSEPH L. SCHOFER, Primary Examiner

C. A. HENDERSON, Jr., Assistant Examiner

U.S. Cl. X.R.

260—41, 46.5, 47, 79.5, 80.7, 94.7, 783

UNITED STATES PATENT OFFICE
CERTIFICATE OF CORRECTION

Patent No. 3,468,855  September 23, 1969

Byron A. Hunter

It is certified that error appears in the above identified patent and that said Letters Patent are hereby corrected as shown below:

Column 6, lines 8 and 9, cancel "polybutadiene-styrene copolymer" and insert -- polybutadiene, butadiene-styrene copolymer --; line 12, cancel "and".

Signed and sealed this 3rd day of February 1970.

(SEAL)
Attest:

Edward M. Fletcher, Jr.  WILLIAM E. SCHUYLER, JR.
Attesting Officer  Commissioner of Patents